US009503928B2

(12) United States Patent
Lin et al.

(10) Patent No.: US 9,503,928 B2
(45) Date of Patent: Nov. 22, 2016

(54) SYSTEMS, METHODS AND APPARATUS FOR ADAPTIVE PERSISTENT ACKNOWLEDGE PRIORITY CONTROL FOR BI-DIRECTIONAL TCP THROUGHPUT OPTIMIZATION

(71) Applicant: QUALCOMM Incorporated, San Diego, CA (US)

(72) Inventors: Jian Lin, Atlanta, GA (US); Insung Kang, San Diego, CA (US); Shanshan Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 14/246,555

(22) Filed: Apr. 7, 2014

(65) Prior Publication Data

US 2015/0289161 A1     Oct. 8, 2015

(51) Int. Cl.
*H04W 28/02* (2009.01)
*H04W 72/04* (2009.01)
*H04L 1/18* (2006.01)

(52) U.S. Cl.
CPC ........ *H04W 28/0278* (2013.01); *H04L 1/1835* (2013.01); *H04L 1/1854* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 5,588,009 A | 12/1996 | Will | |
| 6,894,974 B1 * | 5/2005 | Aweva | .......... H04L 1/0001 370/230.1 |
| 8,379,535 B2 | 2/2013 | Chen et al. | |
| 2002/0097727 A1 * | 7/2002 | Prakash | ............... H04L 12/5692 370/395.42 |
| 2009/0061904 A1 * | 3/2009 | Emrich | ............... H04W 72/005 455/456.6 |
| 2009/0232017 A1 * | 9/2009 | Carlisle | ................... H04L 69/16 370/252 |
| 2012/0307773 A1 | 12/2012 | Tiirola et al. | |
| 2013/0010775 A1 | 1/2013 | Kish et al. | |
| 2013/0215745 A1 | 8/2013 | Shubhakoti et al. | |
| 2013/0324144 A1 | 12/2013 | Warken | |
| 2014/0269302 A1 * | 9/2014 | Morandin | ............... H04L 47/27 370/235 |

FOREIGN PATENT DOCUMENTS

WO     WO-2008040725 A1    4/2008

OTHER PUBLICATIONS

International Search Report and Written Opinion—PCT/US2015/021260—ISA/EPO—Jul. 15, 2015.

* cited by examiner

*Primary Examiner* — Kodzovi Acolatse
(74) *Attorney, Agent, or Firm* — Knobbe Martens Olson & Bear, LLP (57) ABSTRACT

Systems, methods and apparatus for wireless communication are provided. In one aspect, the method comprises receiving at least one downlink packet. The method further comprises generating an acknowledge message in response to receiving the at least one downlink packet. The method further comprises prioritizing the acknowledge message in a buffer according to a probability, the probability based at least in part on a current utilization level of the buffer. The method may further comprise one or more of the following: setting the probability to a first value when the utilization level is below a first level, setting the probability to a second value when the utilization level is above the first level and below a second level, and setting the probability to a third value when the utilization level is above the second level. The second value may be adjusted based on feedback corresponding to a downlink throughput.

20 Claims, 7 Drawing Sheets

SYSTEMS, METHODS AND APPARATUS FOR ADAPTIVE PERSISTENT ACKNOWLEDGE PRIORITY CONTROL FOR BI-DIRECTIONAL TCP THROUGHPUT OPTIMIZATION

BACKGROUND

Field

Certain aspects of the present disclosure generally relate to wireless communications, and more particularly, to systems, apparatus and methods for adaptive persistent acknowledge priority control for bi-directional TCP throughput optimization.

Background

In wireless communication networks, e.g., time division synchronous code division multiple access (TD-SCDMA) networks, many applications may utilize concurrent bi-directional, e.g., uplink (UL) and downlink (DL), transmission control protocol (TCP) transmissions between a mobile user equipment (UE) and a base station (NB). In the presence of a UL TCP session, the TCP acknowledge packets (ACKs) that acknowledge reception of the DL TCP data are conventionally queued behind UL data in a buffer on the UE side. Because an ACK must be received before DL TCP data can continue transmission, queuing ACKs behind other UL data significantly reduces DL throughput. Such a reduction in DL throughput may be attributed to the large round trip time (RTT) caused by the delayed DL ACKs. Such a reduction in DL throughput can also be attributed to the fact that the DL TCP congestion window (CWND) cannot increase beyond the buffering limit of the network side, thus disallowing accommodation of large RTT by allowing many unacknowledged packets on the air. Accordingly, in order to achieve good DL and UL throughput simultaneously, appropriate UE buffer management policies are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for wireless communication. The method comprises receiving at least one downlink packet. The method further comprises generating an acknowledge message in response to receiving the at least one downlink packet. The method further comprises prioritizing the acknowledge message in a buffer according to a probability, the probability based at least in part on a current utilization level of the buffer.

Another aspect of the disclosure provides an apparatus for wireless communication. The apparatus comprises a receiver configured to receive at least one downlink packet. The apparatus further comprises a buffer. The apparatus further comprises a processor configured to generate an acknowledge message in response to receiving the at least one downlink packet, and prioritize the acknowledge message in a the buffer according to a probability, the probability based at least in part on a current utilization level of the buffer.

Another aspect of the disclosure provides a non-transitory computer-readable medium comprising code. The code, when executed, causes the apparatus to receive at least one downlink packet. The code, when executed, further causes the apparatus to generate an acknowledge message in response to receiving the at least one downlink packet. The code, when executed, further causes the apparatus to prioritize the acknowledge message in a buffer according to a probability, the probability based at least in part on a current utilization level of the buffer.

Another aspect of the disclosure provides an apparatus for wireless communication. The apparatus comprises means for receiving at least one downlink packet. The apparatus further comprises means for generating an acknowledge message in response to receiving the at least one downlink packet. The apparatus further comprises means for prioritizing the acknowledge message in a buffer according to a probability, the probability based at least in part on a current utilization level of the buffer.

DETAILED DESCRIPTION

Various aspects of the novel systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, a user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

Figure 1:
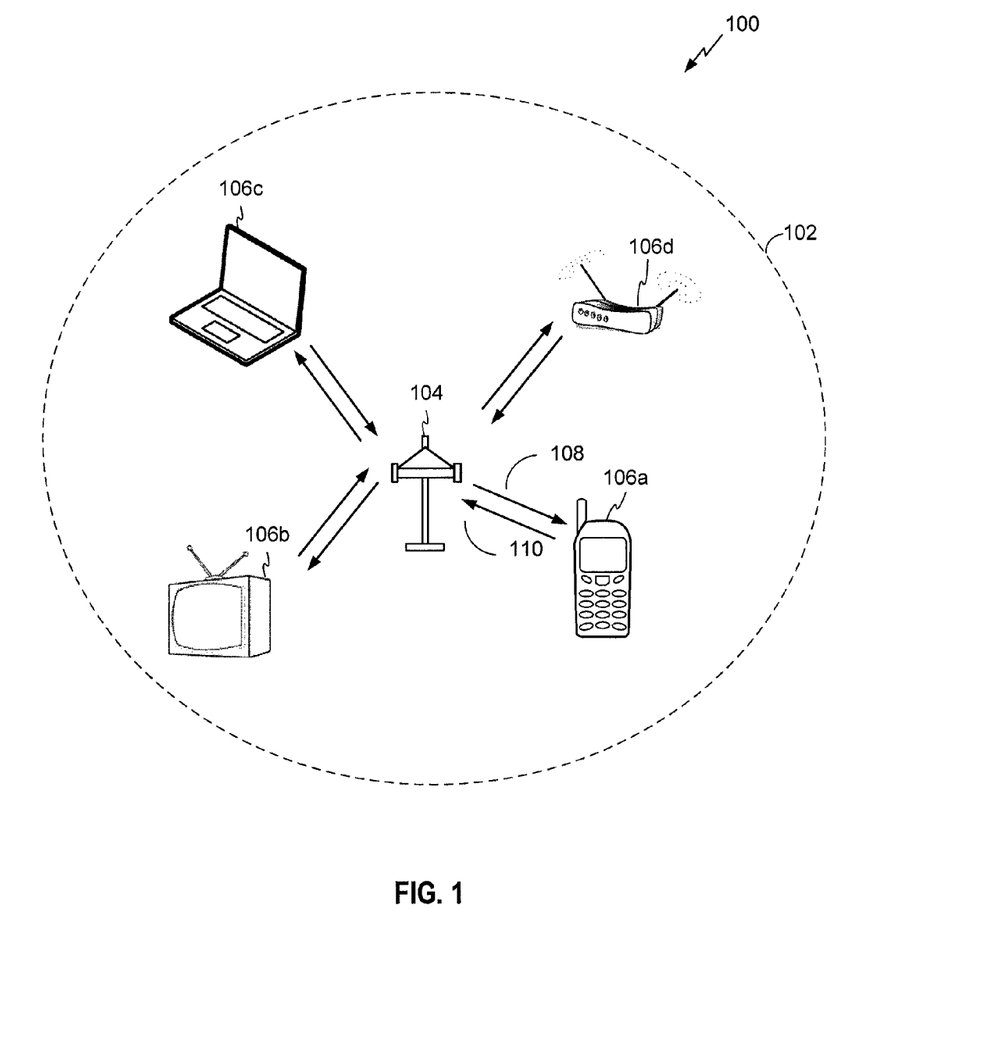
FIG. 1 illustrates an example of a wireless communication system in which aspects of the present disclosure may be employed.

FIG. 1 illustrates an example of a wireless communication system 100 in which aspects of the present disclosure may be employed. The wireless communication system 100 may operate pursuant to a wireless standard, for example at least one of the 802.11ah, 802.11ac, 802.11n, 802.11g and 802.11b standards. The wireless communication system 100 may include an AP 104, which communicates with one or more of STA 106a, 106b, 106c, and/or 106d (collectively referred to as STAs 106a-106d).

A variety of processes and methods may be used for transmissions in the wireless communication system 100 between the AP 104 and the STAs 106a-106d. For example, signals may be transmitted and received between the AP 104 and the STAs 106a-106d in accordance with OFDM/OFDMA techniques. If this is the case, the wireless communication system 100 may be referred to as an OFDM/OFDMA system. Alternatively, signals may be transmitted and received between the AP 104 and the STAs 106a-106d in accordance with CDMA techniques. If this is the case, the wireless communication system 100 may be referred to as a CDMA system.

A communication link that facilitates transmission from the AP 104 to one or more of the STAs 106a-106d may be referred to as a downlink (DL) 108, and a communication link that facilitates transmission from one or more of the STAs 106a-106d to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106a-106d associated with the AP 104 and that use the AP 104 for communication may be referred to as a basic service set (BSS). It should be noted that the wireless communication system 100 may not have a central AP 104, but rather may function as a peer-to-peer network between the STAs 106a-106d. Accordingly, the functions of the AP 104 described herein may alternatively be performed by one or more of the STAs 106a-106d.

Figure 2:
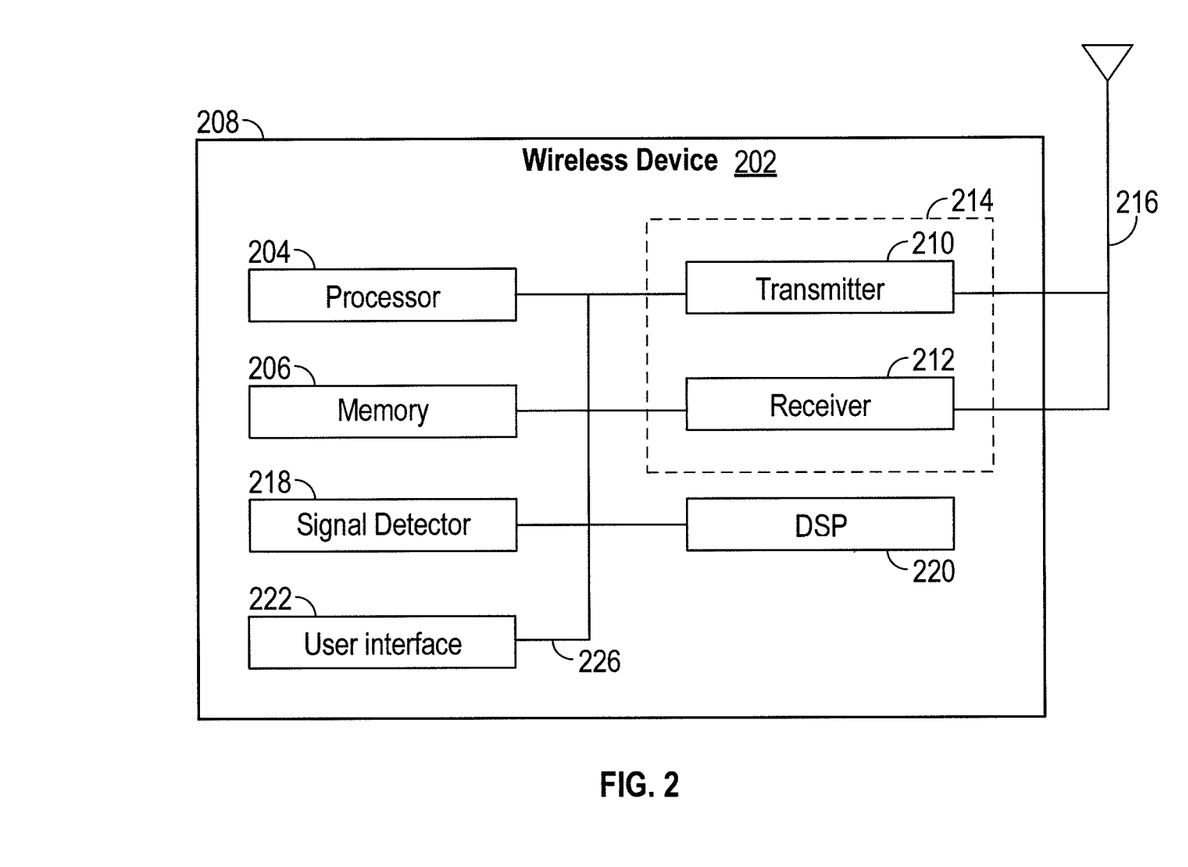
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106a-106d.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. In some implementations, the memory 206 may additionally include one or more buffers for storing queued data for transmission, as will be discussed in more detail in connection with FIGS. 3-9.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas, which may be utilized during MIMO communications, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or any of the STAs 106a-106d, and may be used to transmit and/or receive communications. The communications exchanged between devices in a wireless network may include data units which may comprise packets or frames. In some aspects, the data units may include data frames, control frames, and/or management frames. Data frames may be used for transmitting data from an AP and/or a STA to other APs and/or STAs. Control frames may be used together with data frames for performing various operations and for reliably delivering data (e.g., acknowledging receipt of data, polling of APs, area-clearing operations, channel acquisition, carrier-sensing maintenance functions, etc.). Management frames may be used for various supervisory functions (e.g., for joining and departing from wireless networks, etc.).

Figure 3:
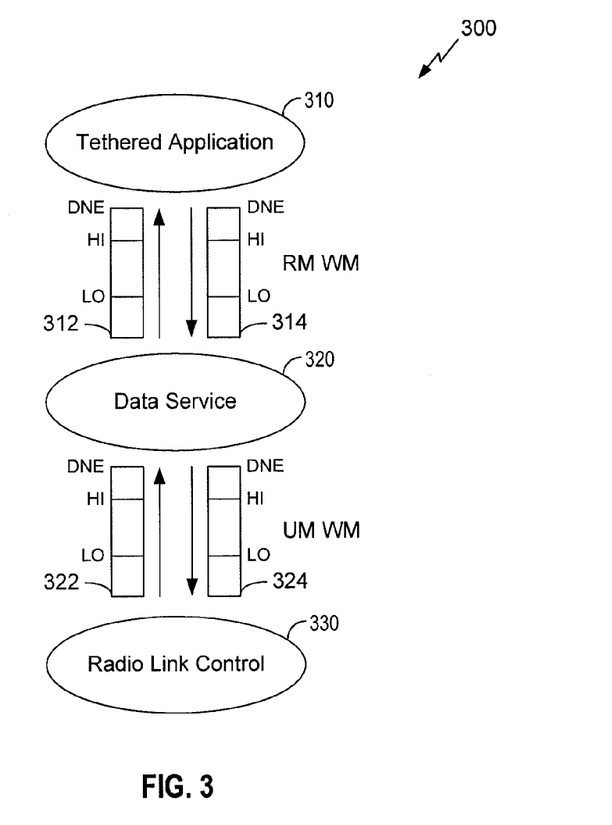
FIG. 3 is a diagram showing uplink and downlink buffers for buffer management in a user equipment, according to an implementation.

FIG. 3 is a diagram showing uplink and downlink buffers for buffer management in a user equipment 300, according to one implementation. In some implementations, the user equipment 300 may comprise any of the STAs 106a-106d of FIG. 1, which are shown in more detail as the wireless device 202 in FIG. 2. FIG. 3 shows a tethered application 310, a data service 320 and a radio link control 330. A downlink path may be shown as the vertical arrows pointing from the radio link control 330 to the data service 320 and from the data service 320 to the tethered application 310. Likewise, an uplink path may be shown as the vertical arrows pointing from the tethered application 310 to the data service 320 and from the data service 320 to the radio link control 330. A resource manager (RM) interface may reside between the tethered application 310 and the data service 320. An uplink manager (UM) interface or air interface may reside between the data service 320 and the radio link control 330. The pair of RM interface and UM interface utilized for DL and UL management, respectively. The RM interface may comprise a downlink buffer 312 and an uplink buffer 314, each having respective LO, HI and DNE watermarks. Similarly, the UM interface may comprise a downlink buffer 322 and an uplink buffer 324, each having respective low (LO), high (HI) and do not exceed (DNE) watermarks. In some implementations, one or more of the buffers 312, 314, 322 and 324 may correspond to the memory 206 of the wireless device 202 in FIG. 2. In some implementations, the LO, HI and DNE watermarks may be the same between two or more of the buffers 312, 314, 322 and 324. In some implementations, the LO, HI and DNE watermarks may be different between any two of the buffers 312, 314, 322 and 324. According to one or more implementations as shown below, these LO, HI and DNE watermarks may be utilized to control prioritization in and usage of the buffers for wireless communications.

A regulation-by-backpressure scheme may now be described, utilizing uplink communications as an example. In the RM interface, when a data level in the uplink buffer 314 reaches or exceeds the HI value, a command is sent by the RM interface to stop data flow from the tethered application 310 to the data service 320. When the data level in the uplink buffer 314 falls below the LO value, the TCP data flow from the tethered application 310 resumes. In the UM interface, when the data level in the uplink buffer 324 reaches or exceeds the HI value, a command is sent by the UM interface to stop the data flow from the RM interface. When the data level of the buffer 324 falls below the LO value, the data flow from the RM interface resumes.

In order to improve both DL and UL throughput, some implementations contemplate prioritizing the placement of ACKs at the front of one or more of the buffers 31, 314, 322 and 324 according to a probability determined according to an adaptive probability-persistent algorithm. The present application contemplates implementations where ACK prioritization is performed in only the RM interface, in only the UM interface, or in both the RM interface and UM interface. However, ACK prioritization in only the RM interface may provide the greatest improvements in both DL and UL throughput. The adaptive probability-persistent algorithm may utilize a data level in the RM interface UL buffer 314 along with a UL throughput and an estimated or determined DL throughput based on information feedback from the NB or base station, as will be discussed in more detail in connection with FIG. 4-8 below.

Figure 4:
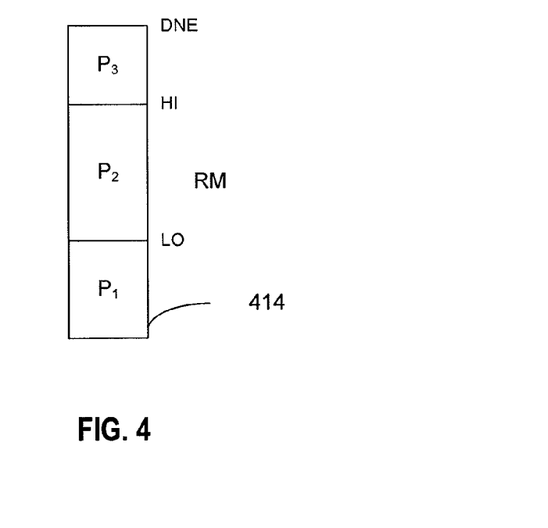
FIG. 4 is a diagram showing a buffer having watermarks for buffer management, according to an implementation.

FIG. 4 is a diagram showing a buffer having watermarks for buffer management, according to one implementation. FIG. 4 shows a buffer 414, which may be substantially the same as the RM interface UL buffer 314 previously shown in FIG. 3. The buffer 414 may include watermarks corresponding to a LO level, a HI level and a DNE level. In some implementations, ACK prioritization in the buffer may be applied according to different probabilities based on the level of data in the buffer 414. For example, if the data level in the buffer 414 is below the LO watermark, a TCP ACK packet for acknowledging successful reception of a previously received TCP DL packet may be inserted in the front of the queue for the buffer 414 with a first probability $P_1$. For the purpose of illustration and not limitation, if $P_1$ equals 0.1 (10%), whenever the data level in the buffer 414 is below the LO watermark, a generated ACK packet may be inserted at the front of the queue for the buffer 414 10% of the time. In this example, for the other 90% of the time the ACK packet may be inserted after any previously queued data in the buffer 414.

Similarly, when the data level of the buffer 414 is between the LO and HI watermarks, the ACK packet may be prioritized or inserted in the front of the queue for the buffer 414 with a second probability $P_2$. Likewise, when the data level of the buffer 414 is between the HI and DNE watermarks, the ACK packet may be prioritized or inserted in the front of the queue for the buffer 414 with a third probability $P_3$.

Some implementations utilize the TCP throughput information of both the UE and the NB. The UE throughput ($TPT_{UL}$) may be determined at the UE without any protocol overhead. However, in order for the UE to be able to determine or estimate the NB throughput, e.g., downlink throughput, information corresponding to the NB throughput may be fed back to the UE periodically, for example with period T. In some implementations, the NB may periodically, e.g., every period T, enclose into a DL data packet, information indicating the maximum or highest transmitted sequence number (SeqNo) associated with a packet transmitted in the downlink direction to the UE during the particular period T. The UE may receive this DL data packet, decode the information indicating the SeqNo., and utilizing at least one additional SeqNo. for a previous period, estimate the DL throughput according to the following equation:

$$TPT_{DL} = \frac{SeqNo(t) - SeqNo(t-T)}{T} \qquad \text{Eq. 1}$$

where $TPT_{DL}$ is the estimated downlink throughput, T is the reporting period, SeqNo(t) is the maximum transmitted sequence number of a DL packet transmitted to the UE during the present period T, and SeqNo(t-T) is the maximum transmitted sequence number of a DL packet transmitted to the UE during the immediately previous period T. Accordingly, the UE may estimate the DL throughput by determining the number of packets sent between one period and an immediately previous period and then dividing by the period of time (T) taken to transmit the packets.

In some implementations, the probabilities $P_1$, $P_2$ and $P_3$ may be dynamically adjusted based on the data level in the buffer as well as previous and/or real-time DL and UL TCP throughputs.

In some implementations, $P_3$ may be fixed to a high level, for example, 1.0. Because ACK prioritization according to the probability $P_3$ only occurs when the data level in the UL buffer 414 is above the HI watermark, the probability $P_3$ will only be utilized when the buffer 414 already has a relatively large amount of UL data queued for transmission compared to the data capacity of the buffer 414. In such an instance, if the ACK packet is queued behind all currently queued UL data, transmission of the ACK packet will be significantly delayed and DL throughput will be significantly decreased. Thus, by fixing $P_3$ at a high value, the ACK packet will be prioritized to the front of the queue for the buffer 414 for a large percentage of the occurrences and thus will significantly increase DL throughput on average while having only a minor effect on UL throughput.

In some other implementations, $P_3$ may instead be fixed to a low level, for example, 0.0. In such a case, if the buffer level exceeds the DNE level, UL packets may be dropped and lost forever due to buffer overflow. Thus, while the buffer level is greater than the HI water mark, in order to avoid losing any UL data, the TCP ACK may be prioritized behind any data to be transmitted for a substantial portion of the occurrences. In such a case, a lower UL throughput is preferable to permanently losing any buffered UL data.

Although the above implementations contemplate $P_3$ having a fixed value, in some other implementations $P_3$ may be dynamically adjusted in a similar manner to that of the probabilities $P_1$ and $P_2$ as described below in more detail in connection with FIGS. 5 and 6.

As stated above, to achieve a greater improvement in both UL and DL throughput, the UE may adjust the values of one or both of the probabilities $P_1$ and $P_2$ during or after each feedback period T. FIG. 5 is a flow chart for updating a first probability for ACK prioritization, according to an implementation. When the data level in the buffer 414 is below the LO watermark, under certain circumstances the probability $P_1$ may be reduced so as to increase the UL throughput. For example, by reducing the probability $P_1$ that the ACK packet will be prioritized to the front of the buffer queue, the UL data already queued will be given priority and will be transmitted first. However, if the UL throughput is already above a desired value the probability $P_1$ may be increased such that ACK packets are prioritized to the front of the queue more often to improve DL throughput. Flowchart 500 may begin at block 502. The method may progress to block 504 which includes determining whether the RM interface buffer level ($Buffer_{RM}$) is below the RM interface LO watermark ($RM_{LO}$). If the determination is yes (Y) the method may progress to block 506. If the determination is no (N) the method may progress to block 510. Block 506 includes determining whether the UL throughput ($TPT_{UL}$) is greater than a desired UL throughput ($TPT_{ULDesired}$) minus a margin of error for the UL throughout ($M_{UL}$). If the determination is yes (Y) the method may progress to block 508. If the determination is no (N), the method may progress to block 510. At block 508 the probability $P_1$ may be increased to the lesser of a probability of 1.0 and the current value of $P_1$ plus a predetermined step size for $P_1$ ($\Delta_1$). The method may then end at block 512. At block 510, the probability $P_1$ may be decreased to the greater of a probability of 0.0 and the current value of $P_1$ minus the predetermined step size for $P_1$ ($\Delta_1$). The method may then end at block 512.

Figure 5:
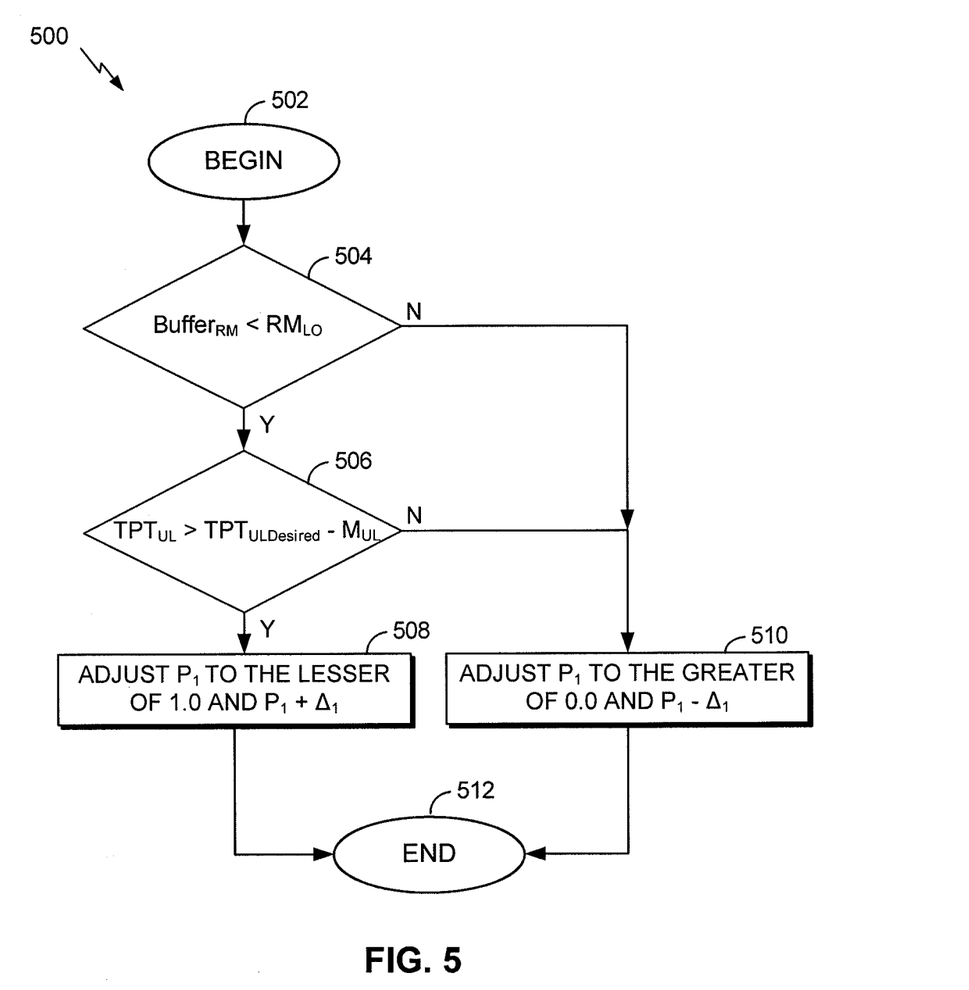
FIG. 5 is a flow chart for updating a first probability for ACK prioritization, according to an implementation.
Figure 6:
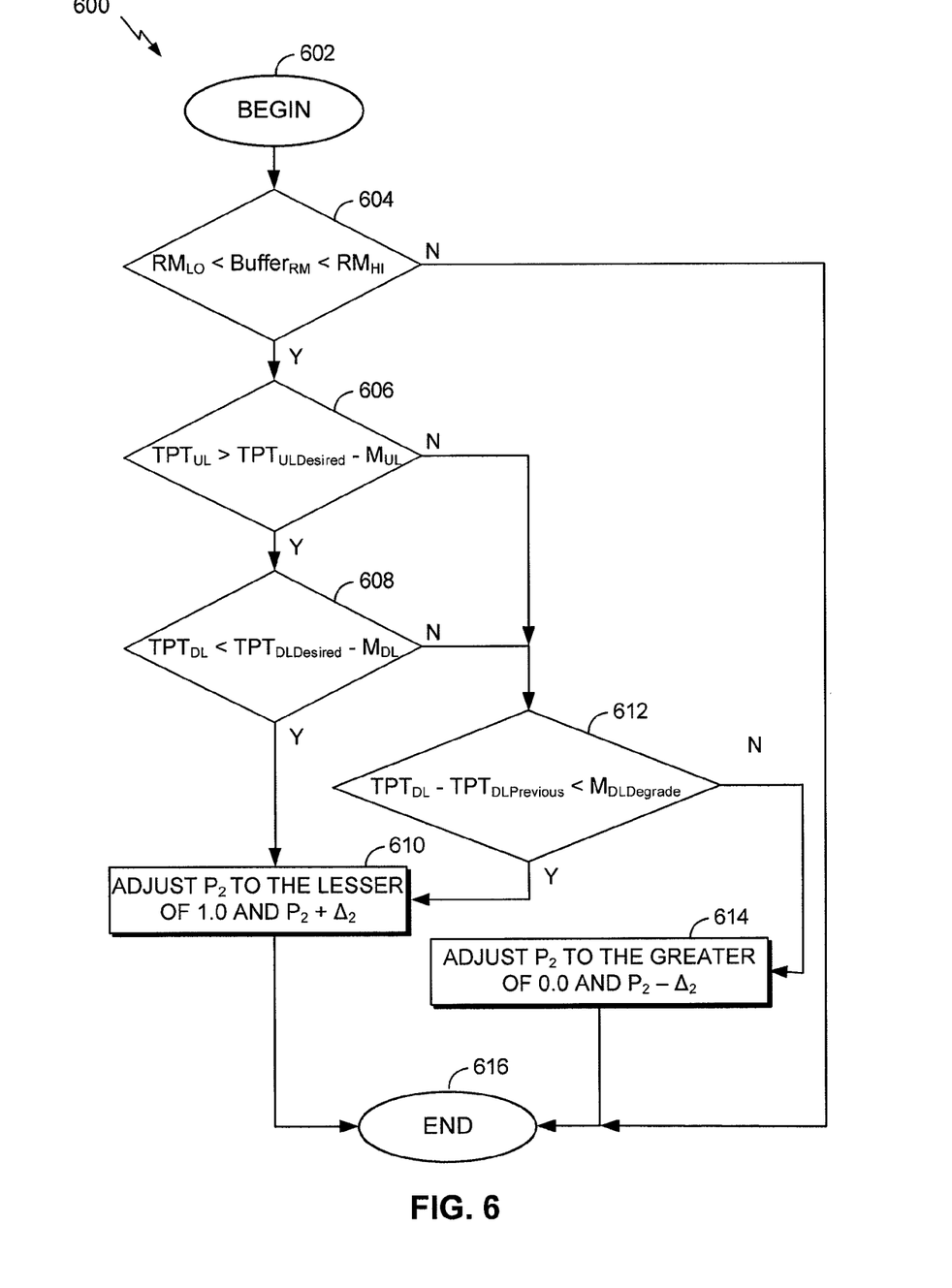
FIG. 6 is a flow chart for updating a second probability for ACK prioritization, according to an implementation.

An example of a computer-readable code for executing the method described in FIG. 5 is disclosed below:

```
If (buffer_RM < RM_LO and TPT_UL > TPT_DesiredUL -M_UL)
    P_1 = min(1 P_1 + Δ_1)
Else
    P_1 = max(0, P_1 - Δ_1)
End
```

In some implementations, the UE may additionally adjust the value of the probability $P_2$ based on the data level in the buffer, and one or both of the UL throughput and feedback corresponding to the DL throughput. FIG. 6 is a flow chart for updating a second probability for acknowledge message (ACK) prioritization, according to an implementation. When the data level in the buffer is between the HI and LO watermarks, under certain circumstances the probability $P_2$ may be increased in order to increase the DL throughput. For example, by increasing the probability $P_2$ that the ACK packet will be prioritized to the front of the buffer queue, the ACK packets will be given priority and will be transmitted before any previously queued UL data. This reduces the round trip time for DL data packets and increases DL throughput. However, if the UL throughput is less than a desired value or the DL throughput is already greater than a desired value, the probability $P_2$ may be reduced such that ACK packets are prioritized to the front of the queue less often to improve UL throughput. Flowchart 600 may begin at block 602. The method may progress to block 604 which includes determining whether the RM interface buffer level ($Buffer_{RM}$) is between the RM interface LO watermark ($RM_{LO}$) and the RM interface HI watermark ($RM_{HI}$). If the determination is yes (Y) the method may progress to block 606. If the determination is no (N) the method may progress to end block 616. Block 606 includes determining whether the UL throughput ($TPT_{UL}$) is greater than a desired UL throughput ($TPT_{ULDesired}$) minus a margin of error for the UL throughout ($M_{UL}$). If the determination is yes (Y) the method may progress to block 608. If the determination is no (N), the method may progress to block 612. At block 608 it may be determined whether the DL throughput ($TPT_{DL}$) is less than a desired DL throughput ($TPT_{DesiredDL}$) minus a margin of error for the DL throughout ($M_{DL}$). If the determination is yes (Y) the method may progress to block 610. If the determination is no (N) the method may progress to block 612. At block 610 the probability $P_2$ may be increased to the lesser of a probability of 1.0 and the current value of $P_2$ plus a predetermined step size for $P_2$ ($\Delta_2$). The method may then end at block 616. At block 612, it may be determined whether the difference between a current DL throughput ($TPT_{DL}$) and a DL throughput during the last period T ($TPT_{DLPrevious}$) is less than a degradation tolerance for DL throughput ($M_{DL}$). If the determination is yes (Y) the method may progress to block 610 where $P_2$ may be increased as previously described. If the determination is no (N) the method may progress to block 614. At block 614, the probability $P_2$ may be decreased to the greater of a probability of 0.0 and the current value of $P_2$ minus the predetermined step size for $P_2$ ($\Delta_2$). The method may then end at block 616.

An example of a computer-readable code for executing the method described in FIG. 6 may be as disclosed below:

```
If (RM_LO < buffer_RM < RM_HI and TPT_UL > TPT_DesiredUL -M_UL
    and TPT_DL < TPT_DesiredDL -M_DL)
    P_2 = min(1, P_2+Δ_2)
Else if (RM_LO < buffer_RM < RM_HI)
    If (TPT_DL - TPT_PreviousDL < M_DegradeDL)
        P_2 = min(1, P_2+Δ_2)
    Else
        P_2 = max(0, P_2- Δ_2)
    End
End
```

Figure 7:
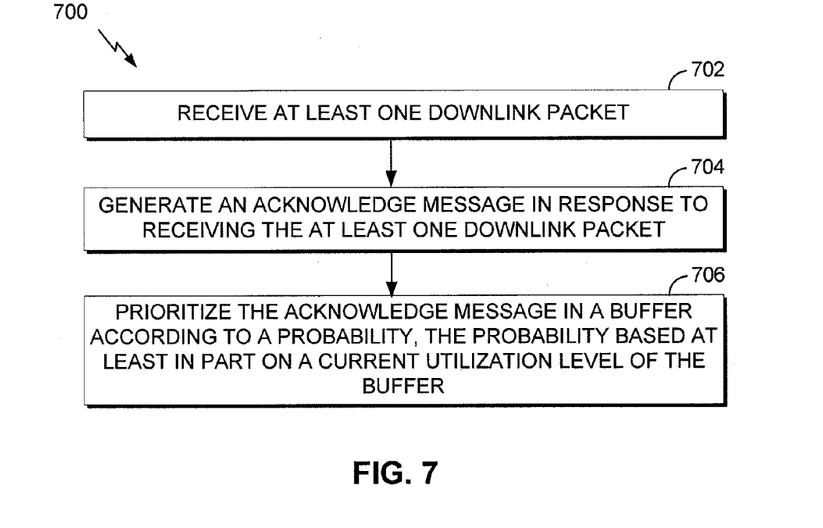
FIG. 7 is a flow chart for a method for wireless communication, according to an implementation.

FIG. 7 is a flow chart for a method for wireless communication, according to an implementation. In some implementations, one or more of the steps in flowchart 700 may be performed by, or in connection with, a processor and/or receiver, such as the processor 204 and the receiver 212 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 700 may begin with operation block 702, which may include receiving at least one downlink packet. For example, any of the STAs 106a-106d in FIG. 1 being shown in more detail as the wireless device 202 of FIG. 2, the receiver 212 of the wireless device 202 may be configured to receive at least one downlink packet from, for example, the AP 104.

Operation block 704 may include generating an acknowledge message in response to receiving the at least one downlink packet. For example, the processor 204 of the wireless device 202 may be configured to generate an ACK packet for eventual transmission back to the AP 104 to acknowledge receipt of the at least one downlink packet.

Operation block 706 may include prioritizing the acknowledge message in a buffer according to a probability, the probability based at least in part on a current utilization level of the buffer. For example, the processor 204 of the wireless device 202 in FIG. 2 may perform ACK message prioritizing as previously described in connection with any of FIGS. 3-6. The ACK message may be prioritized in a buffer that may be located in at least a portion of the memory 206 of the wireless device 202 in FIG. 2.

Figure 8:
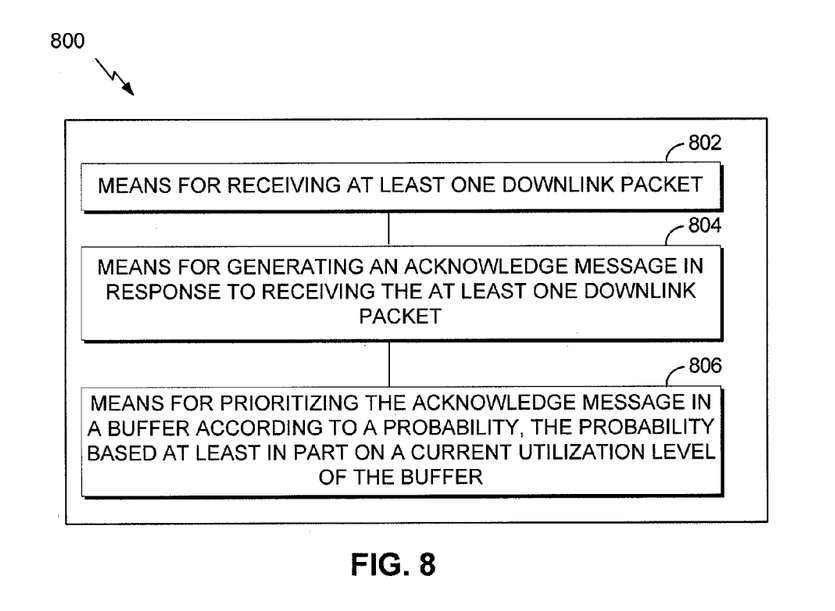
FIG. 8 is a functional block diagram of an exemplary device for wireless communication, according to an implementation.

FIG. 8 is a functional block diagram of an exemplary device for wireless communication, according to an implementation. Those skilled in the art will appreciate that the apparatus may have more components than illustrated in FIG. 8. The apparatus 800 includes only those components useful for describing some prominent features of implementations within the scope of the claims. In some implementations, the apparatus 800 may be configured to perform the method 700 as previously described in connection with FIG. 7. The apparatus 800 may comprise any of the STAs 106*a*-106*d* shown in FIG. 1, for example, which may be shown in more detail as the wireless device 202 shown in FIG. 2.

The apparatus 800 comprises means 802 for receiving at least one downlink packet. In some implementations, the means 802 can be configured to perform one or more of the functions described above with respect to block 702 of FIG. 7. The means 802 may comprise at least the receiver 212 shown in FIG. 2, for example.

The apparatus 800 may further include means 804 for generating an acknowledge message in response to receiving the at least one downlink packet. In some implementations, the means 804 can be configured to perform one or more of the functions described above with respect to block 704 of FIG. 7. The means 804 may comprise at least the processor 204 shown in FIG. 2, for example. In some implementations, the means 804 may additionally comprise the memory 206 shown in FIG. 2, for example.

The apparatus 800 may further include means 806 for prioritizing the acknowledge message in a buffer according to a probability, the probability based at least in part on a current utilization level of the buffer. In some implementations, the means 806 can be configured to perform one or more of the functions described above with respect to block 706 of FIG. 7. The means 806 may comprise at least the processor 208 shown in FIG. 2, for example. In some implementations, the means 806 may additionally comprise the memory 206 shown in FIG. 2, for example. In some implementations, the apparatus 800 may additionally include means for performing any steps or functions as previously described above in connection with any of FIGS. 5-7.

Figure 9:
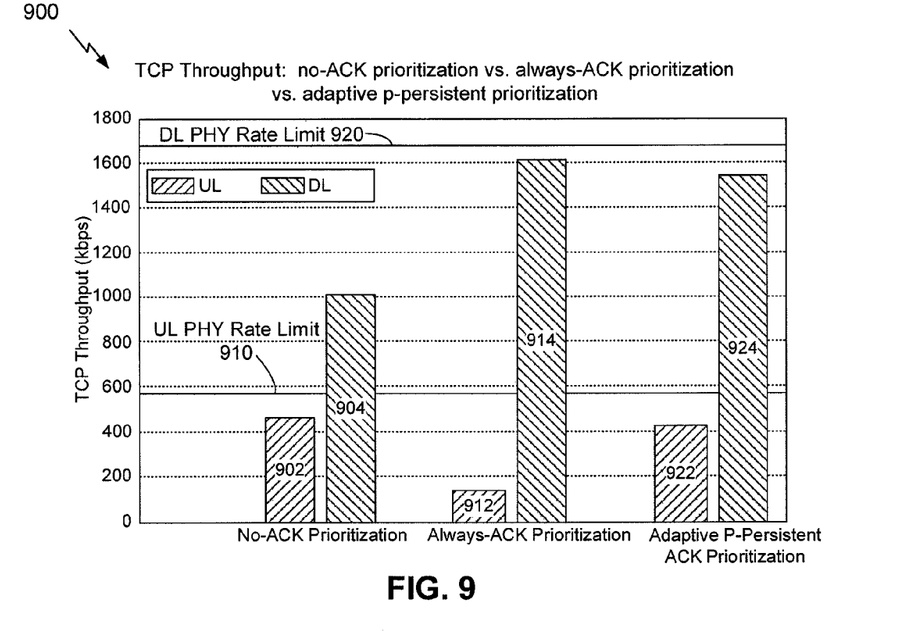
FIG. 9 is a chart comparing TCP throughput utilizing no ACK prioritization, TCP throughput always utilizing ACK prioritization, and TCP throughput utilizing adaptive probability-persistent prioritization in accordance with some implementations.

FIG. 9 is a chart 900 comparing TCP throughput utilizing no ACK prioritization, TCP throughput always utilizing ACK prioritization, and TCP throughput utilizing adaptive probability-persistent prioritization in accordance with some implementations. Chart 900 shows both UL TCP throughput and DL TCP throughput in kilobits per second (kbps) for each of three cases: 1) where no ACK prioritization is performed, 2) where ACK prioritization is always performed, and 3) where adaptive probability-persistent ACK prioritization is performed as contemplated by the present application. The chart 900 includes a UL PHY rate limit 910, which marks the theoretical upper limit for UL throughput, as well as DL PHY rate limit 920, which marks the theoretical upper limit for DL throughput. As shown by the chart 900, where no ACK prioritization is utilized the measured UL throughput 902 has relatively high value (exceeding 400 kbps) compared to the UL PHY rate limit 910 of nearly 600 kbps. However, because ACK packets are always queued behind of any currently queued UL data in the buffer, DL packet round trip times (RTT) are significantly increased, causing a substantial decrease in measured DL throughput 904 (receding to approximately 1000 kbps) compared to the DL PHY rate limit 920 of more than 1600 kbps.

When ACK prioritization is always utilized, all ACK packets are prioritized to the front of the queue of the UL buffer, resulting in substantially decreased RTT for DL data packets and a substantial increase in the measured DL throughput 914 compared to never prioritizing ACK packets. As shown, the measured DL throughput 914 (exceeding 1600 kbps) approaches the DL PHY rate limit 920. However, when ACK prioritization is always utilized, the measured UL throughput 912 is severely compromised, receding to a value substantially below 200 kbps. This is because every ACK packet is prioritized to the front of the queue of the UL buffer ahead of any previously queued UL data, causing substantial delay in UL data transmission.

When adaptive probability-persistent ACK prioritization is utilized, DL throughput may be substantially increased with only a minor reduction in UL throughput. As shown in chart 900, measured DL throughput 924 (approaching 1600 kbps) may approach the DL PHY rate limit 920, achieving values only slightly less than those achieved by always prioritizing ACK packets. Furthermore, measured UL throughput 922 (exceeding 400 kbps) may also approach the UL PHY rate limit 910, achieving values only slightly less than those achieved by never prioritizing ACK packets. Thus, the use of adaptive probability-persistent ACK prioritization achieves the benefits offered by each of never and always prioritizing ACK packets while avoiding the corresponding detriments to the DL or UL throughput. Moreover, because at least the probabilities $P_1$ and $P_2$ are dynamically adjusted based on the buffer level and one or both of real-time UL throughout and feedback corresponding to DL throughput, the most efficient balance between UL and DL throughput can be consistently maintained.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
   receiving, at a device, at least one downlink packet;
   generating, at the device, an acknowledge message in response to receiving the at least one downlink packet; and
   selectively inserting the acknowledge message at a front of a queue of a buffer according to a probability value of inserting the acknowledge message at the front of the queue of the buffer, the probability value being set based in part on a utilization level of the buffer.

2. The method of claim 1, further comprising one or more of the following:
   setting the probability value to a first value when the utilization level of the buffer is below a first level;
   setting the probability value to a second value when the utilization level of the buffer is above the first level and below a second level; and
   setting the probability value to a third value when the utilization level of the buffer is above the second level.

3. The method of claim 2, further comprising adjusting the first value based at least in part on an uplink throughput.

4. The method of claim 2, further comprising adjusting the second value based at least in part on one or both of an uplink throughput and feedback corresponding to a downlink throughput.

5. The method of claim 4, wherein the feedback comprises an indication of a largest sequence number associated with a downlink packet transmitted in each of two consecutive time periods, the method further comprising determining the downlink throughput based at least in part on the largest sequence number associated with the downlink packet transmitted in each of the two consecutive time periods.

6. An apparatus for wireless communication, comprising:
   a receiver configured to receive at least one downlink packet;
   a buffer, including a queue; and a processor configured to generate an acknowledge message in response to receiving the at least one downlink packet, and selectively insert the acknowledge message at a front of the queue of the buffer according to a probability value of inserting the acknowledge message at the front of the queue of the buffer, the probability value being set based in part on a utilization level of the buffer.

7. The apparatus of claim 6, wherein the processor is further configured to:
set the probability value to a first value when the utilization level of the buffer is below a first level;
set the probability value to a second value when the utilization level of the buffer is above the first level and below a second level; and
set the probability value to a third value when the utilization level of the buffer is above the second level.

8. The apparatus of claim 7, wherein the processor is further configured to adjust the first value based at least in part on an uplink throughput.

9. The apparatus of claim 7, wherein the processor is further configured to adjust the second value based at least in part on one or both of an uplink throughput and feedback corresponding to a downlink throughput.

10. The apparatus of claim 9, wherein the feedback comprises an indication of a largest sequence number associated with a downlink packet transmitted in each of two consecutive time periods, and the processor is further configured to determine the downlink throughput based at least in part on the largest sequence number associated with the downlink packet transmitted in each of the two consecutive time periods.

11. A non-transitory computer-readable medium comprising code that, when executed, causes an apparatus to:
receive at least one downlink packet;
generate an acknowledge message in response to receiving the at least one downlink packet; and
selectively insert the acknowledge message at a front of a queue of a buffer according to a probability value of inserting the acknowledge message at the front of the queue of the buffer, the probability value being set based in part on a utilization level of the buffer.

12. The non-transitory computer-readable medium of claim 11, wherein the code, when executed, further causes the apparatus to:
set the probability value of to a first value when the utilization level of the buffer is below a first level;
set the probability value of to a second value when the utilization level of the buffer is above the first level and below a second level; and
set the probability value of to a third value when the utilization level of the buffer is above the second level.

13. The non-transitory computer-readable medium of claim 12, wherein the code, when executed, further causes the apparatus to adjust the first value based at least in part on an uplink throughput.

14. The non-transitory computer-readable medium of claim 12, wherein the code, when executed, further causes the apparatus to adjust the second value based at least in part on one or both of an uplink throughput and feedback corresponding to a downlink throughput.

15. The non-transitory computer-readable medium of claim 14, wherein the feedback comprises an indication of a largest sequence number associated with a downlink packet transmitted in each of two consecutive time periods, and the code, when executed, further causes the apparatus to determine the downlink throughput based at least in part on the largest sequence number associated with the downlink packet transmitted in each of the two consecutive time periods.

16. An apparatus for wireless communication, comprising:
means for receiving at least one downlink packet;
means for generating an acknowledge message in response to receiving the at least one downlink packet; and
means for selectively inserting the acknowledge message at a front of a queue of a buffer according to a probability value of inserting the acknowledge message at the front of the queue of the buffer, the probability value being set based in part on a utilization level of the buffer.

17. The apparatus of claim 16, further comprising:
means for setting the probability value to a second value when the utilization level of the buffer is below a first level;
means for setting the probability value to a second value when the utilization level of the buffer is above the first level and below a second level; and
means for setting the probability value to a second value when the utilization level of the buffer is above the second level.

18. The apparatus of claim 17, wherein the means for setting the probability value to a first value is further configured to adjust the first value based at least in part on an uplink throughput.

19. The apparatus of claim 17, wherein the means for setting the probability value to a second value is further configured to adjust the second value based at least in part on one or both of an uplink throughput and feedback corresponding to a downlink throughput.

20. The apparatus of claim 19, wherein the feedback comprises an indication of a largest sequence number associated with a downlink packet transmitted in each of two consecutive time periods, the apparatus further comprising means for determining the downlink throughput based at least in part on the largest sequence number associated with the downlink packet transmitted in each of the two consecutive time periods.

* * * * *